United States Patent
Koch et al.

(10) Patent No.: US 12,245,542 B2
(45) Date of Patent: Mar. 11, 2025

(54) SYSTEMS, IMPLEMENTS, AND METHODS FOR SEED ORIENTATION WITH ADJUSTABLE SINGULATORS DURING PLANTING

(71) Applicant: Precision Planting LLC, Tremont, IL (US)

(72) Inventors: Dale Koch, Tremont, IL (US); Jeremy Hodel, Morton, IL (US); Todd Swanson, Morton, IL (US); Ian Radtke, Washington, IL (US)

(73) Assignee: Precision Planting LLC, Tremont, IL (US)

(*) Notice: Subject to any disclaimer, the term of this patent is extended or adjusted under 35 U.S.C. 154(b) by 57 days.

(21) Appl. No.: 18/310,854

(22) Filed: May 2, 2023

(65) Prior Publication Data

US 2023/0270040 A1  Aug. 31, 2023

Related U.S. Application Data

(62) Division of application No. 16/316,601, filed as application No. PCT/US2017/042006 on Jul. 13, 2017, now Pat. No. 11,678,601.

(60) Provisional application No. 62/362,463, filed on Jul. 14, 2016.

(51) Int. Cl.
*A01C 7/04* (2006.01)
*A01C 7/20* (2006.01)

(52) U.S. Cl.
CPC ............ *A01C 7/0443* (2023.05); *A01C 7/046* (2013.01); *A01C 7/201* (2013.01); *A01C 7/20* (2013.01)

(58) Field of Classification Search
CPC .............................. A01C 7/0443; A01C 7/105
See application file for complete search history.

(56) References Cited

U.S. PATENT DOCUMENTS

| | | | |
|---|---|---|---|
| 3,608,787 A * | 9/1971 | Grataloup | A01C 7/046 222/342 |
| 3,982,661 A | 9/1976 | Feltrop | |
| 4,029,235 A * | 6/1977 | Grataloup | A01C 7/046 221/211 |
| 5,650,609 A * | 7/1997 | Mertins | A01C 7/105 250/222.2 |
| 6,564,730 B2 | 5/2003 | Crabb et al. | |
| 7,699,009 B2 | 4/2010 | Sauder et al. | |
| 7,938,075 B1 * | 5/2011 | Glendenning | A01C 7/105 111/900 |

(Continued)

FOREIGN PATENT DOCUMENTS

| | | | | |
|---|---|---|---|---|
| CN | 106165580 A | * | 11/2016 | |
| CN | 114303614 A | * | 4/2022 | A01B 69/00 |
| EP | 3172954 A1 | * | 5/2017 | A01C 1/025 |

OTHER PUBLICATIONS

European Patent Office, Search Report related to EP Patent Application No. EP17828494.9, mail date Jan. 17, 2020, 10 pages.

(Continued)

*Primary Examiner* — Alicia Torres (57) ABSTRACT

A system for seed orientation includes a seed disk capable of rotation in operation and having at least one singulator to adjust an orientation of seed to a desired seed orientation for placement within a furrow during planting. A vision system in proximity to the seed disk determines seed orientation data for seed on the seed disk.

13 Claims, 9 Drawing Sheets

(56) References Cited

U.S. PATENT DOCUMENTS

| | | |
|---|---|---|
| 8,985,037 B2 | 3/2015 | Radtke et al. |
| 9,277,688 B2 * | 3/2016 | Wilhelmi ............... A01C 7/121 |
| 10,462,952 B2 | 11/2019 | Koch et al. |
| 2018/0124993 A1 | 5/2018 | Schaefer et al. |

OTHER PUBLICATIONS

European Patent Office, International Search Report related to International Patent Application No. PCT/US2017/42006, mail date Sep. 13, 2017, 2 pages.

China National Intellectual Property Administration, Office Action related to Chinese Patent Application No. CN 201780056437.9, mail date Jun. 23, 2021, 11 pages.

National Institute of Industrial Property, Search Report related to Brazilian Patent Application No. BR112019000492-0, mail date Jun. 30, 2022, 22 pages.

\* cited by examiner

SYSTEMS, IMPLEMENTS, AND METHODS FOR SEED ORIENTATION WITH ADJUSTABLE SINGULATORS DURING PLANTING

RELATED APPLICATIONS

This application is a divisional of U.S. patent application Ser. No. 16/316,601, filed Jan. 9, 2019, which is a national phase entry under 35 U.S.C. § 371 of International Patent Application PCT/US2017/042006, filed Jul. 13, 2017, designating the United States of America and published in English as International Patent Publication WO 2018/013858 A1 on Jan. 18, 2018, which claims the benefit of the filing date of U.S. Provisional Patent Application 62/362,463, Systems, Implements, and Methods for Seed Orientation with Adjustable Singulators During Planting," filed Jul. 14, 2016, the entire disclosure of each of which is hereby incorporated herein by reference.

TECHNICAL FIELD

Embodiments of the present disclosure relate to systems, implements, and methods for seed orientation with adjustable singulators during planting within seed furrows or trenches of agricultural fields.

BACKGROUND

Planters are used for planting seeds of crops (e.g., corn, soybeans) in a field. Seeds need to be planted with consistent spacing and with a high speed to decrease planting time. However, the seeds are delivered within a furrow or trench in a non-uniform manner and this can negatively affect growth conditions of the crops.

BRIEF DESCRIPTION OF THE DRAWINGS

The present disclosure is illustrated by way of example, and not by way of limitation, in the figures of the accompanying drawings and in which.

SUMMARY

Described herein are systems, implements, and methods for seed orientation during planting operations of agricultural plants of agricultural fields. In one embodiment, a system for seed orientation includes a seed disk capable of rotation in operation and having at least one singulator to adjust an orientation of seed to a desired seed orientation for placement within a furrow during planting. A vision system in proximity to the seed disk determines seed orientation data for seed on the seed disk.

DETAILED DESCRIPTION

Described herein are systems, implements, and methods for seed orientation during planting operations of agricultural plants of agricultural fields.

In one embodiment, a system for seed orientation includes a seed disk capable of rotation in operation and having at least one singulator or seed orienter to adjust an orientation of seed to a desired seed orientation for placement within a furrow during planting. A vision system in proximity to the seed disk determines seed orientation data for seed on the seed disk and provides feedback for controlling the orienter mechanism. A desired and uniform seed orientation for seed in a furrow or trench causes faster uniform emergence of plants from the soil, approximately uniform growth and height of the plants, approximately uniform consumption of water and nutrients of the plants, and approximately uniform collection of sunlight for each plant.

The uniform emergence of plants improves growth conditions due to less shading from adjacent plants and leaves and more sunlight per leaf of the plant. A desired range of leaf orientations can also allow the leaves to be more visible from above and thus improve conditions for application of foliar treatment of fertilizer or pesticide. The desired range of leaf orientations can also shade weeds to a greater extent to reduce weed growth.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
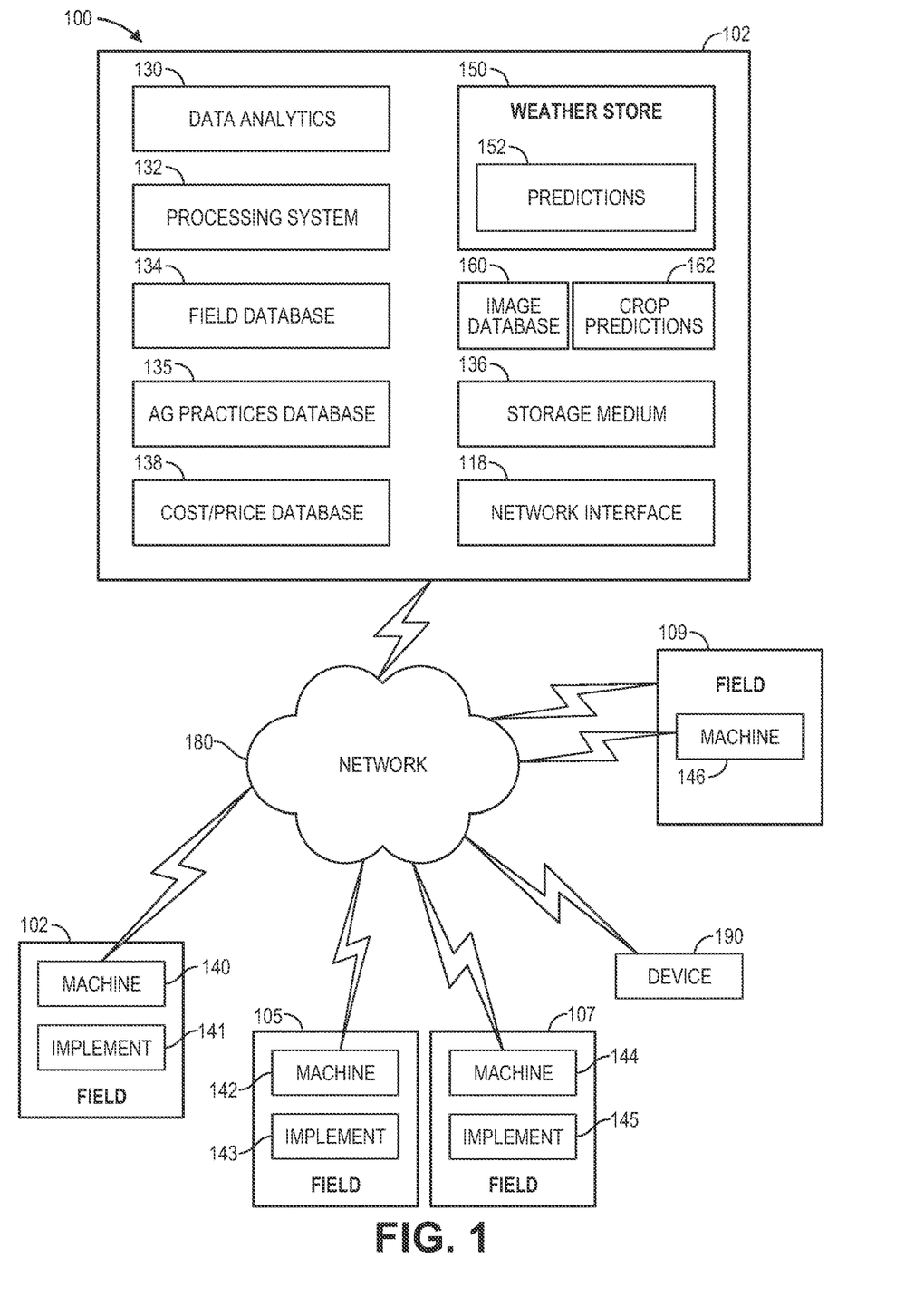
FIG. 1 shows an example of a system for performing agricultural operations (e.g., planting operations) of agricultural fields including operations of an implement having row units in accordance with one embodiment.

FIG. 1 shows an example of a system for performing agricultural operations (e.g., planting operations) of agricultural fields including operations of an implement having row units in accordance with one embodiment. For example and in one embodiment, the system 100 may be implemented as a cloud based system with servers, data processing devices, computers, etc. Aspects, features, and functionality of the system 100 can be implemented in servers, planters, planter monitors, combines, laptops, tablets, computer terminals, client devices, user devices (e.g., device 190), handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1. The system 100 (e.g., cloud based system) and agricultural operations can control and monitor seed orientation within a planting furrow or trench during planting using an implement or machine. The system 100 includes machines 140, 142, 144, 146 and implements 141, 143, 145 coupled to a respective machine. The implements (or machines) can include row units for planting operations of crops within associated fields (e.g., fields 102, 105, 107, 109). The system 100 includes an agricultural analysis system 102 that includes a weather store 150 with current and historical weather data, weather predictions module 152 with weather predictions for different regions, and at least one processing system 132 for executing instructions for controlling and monitoring different operations (e.g., planting, fertilizing). The storage medium 136 may store instructions, software, software programs, etc., for execution by the processing system and for performing operations of the agricultural analysis system 102. In one example, storage medium 136 may contain a planting prescription (e.g., planting prescription that relates georeferenced positions in the field to planting parameters (e.g., soil type, downforce, speed, seed orientation, etc.). The implement 141 (or any of the implements) may include an implement 200 whose sensors and/or controllers may be specifically the elements that are in communication with the network 180 for sending control signals or receiving as-applied data.

An image database 160 stores captured images of crops at different growth stages. A data analytics module 130 may perform analytics on agricultural data (e.g., images, weather, field, yield, etc.) to generate crop predictions 162 relating to agricultural operations.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, as-applied spraying information, as-applied fertilization information, planting population, applied nutrients (e.g., nitrogen), yield levels, proprietary indices (e.g., ratio of seed population to a soil parameter), etc.) for the fields that are being monitored by the system 100. An implement can obtain seed orientation data and provide this data to the system 100. A cost/price database 138 stores input cost information (e.g., cost of seed, cost of nutrients (e.g., nitrogen)) and commodity price information (e.g., revenue from crop).

The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface include one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for controlling and monitoring planting operations or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 2:
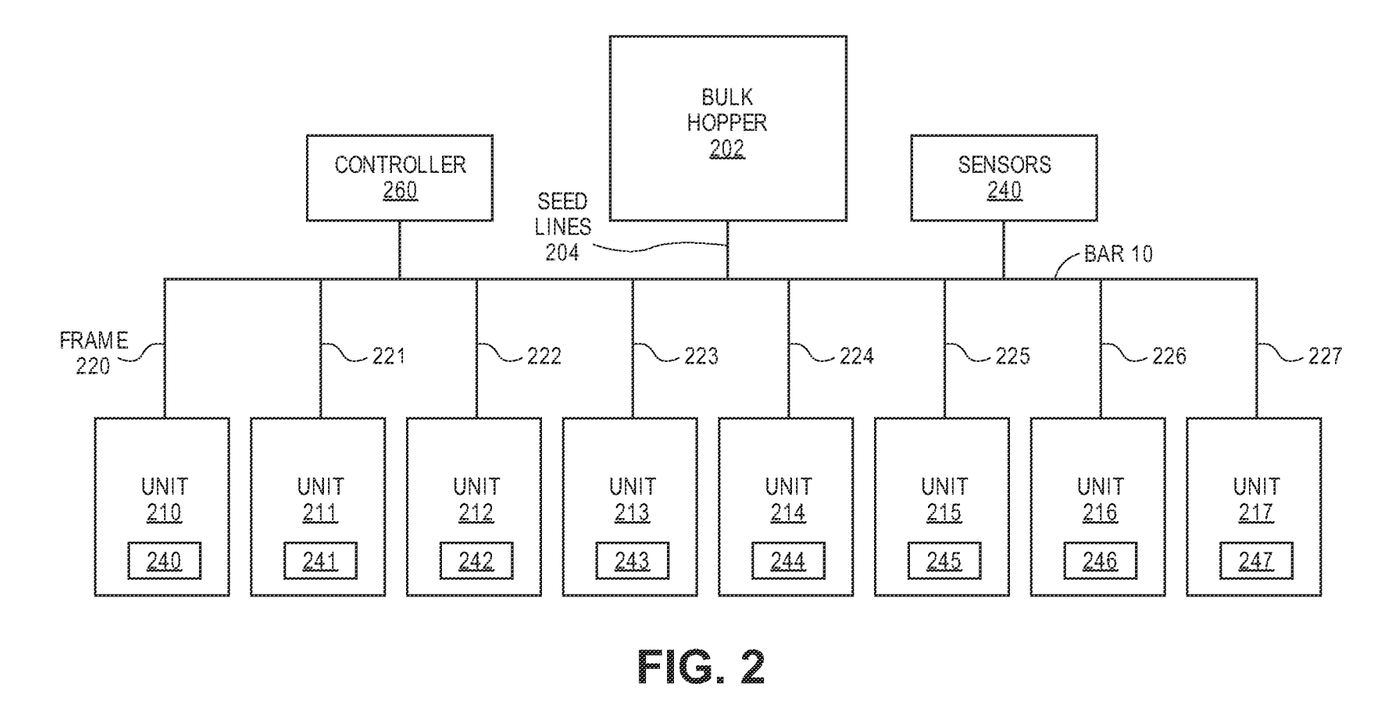
FIG. 2 illustrates an architecture of an implement 200 for planting operations in trenches of agricultural fields in accordance with one embodiment.

FIG. 2 illustrates an architecture of an implement 200 for planting operations in trenches of agricultural fields in accordance with one embodiment. The implement 200 (e.g., planter, cultivator, plough, etc.) includes at least one bulk hopper 202 with each bulk hopper containing a seed variety (e.g., a seed variety or a soybean variety). Each bulk hopper is preferably in fluid communication with an individual seed entrainer (not shown). Each seed entrainer is preferably mounted to a lower outlet of the associated bulk hopper 202. Each seed entrainer is preferably in fluid communication with a pneumatic pressure source and configured to convey air-entrained seeds through a plurality of seed lines 204 to the row units 220-217. A controller 260 (e.g., drive controller) is preferably configured to generate a drive command signal corresponding to a desired rate of seed disc rotation for seed meters of the row units. The drive controller 260 is preferably in data communication with a planter monitor of a machine. The implement also includes sensors 240 (e.g., speed sensors, seed sensors for detecting passage of seed, downforce sensors, actuator valves, speed sensors for the machine, seed force sensors for a planter, vacuum, lift, lower sensors for an implement, etc.) for controlling and monitoring operations of the implement. The sensors can be utilized on the implement 200 either row-by-row of row units or upstream of where the seed lines branch out to the row units as illustrated in FIG. 2.

The row units are mechanically coupled to the frames 220-227 which are mechanically coupled to a bar 10. Each row unit can include sensors and components having a seed orientation mechanism (e.g., seed disk, conveyor belt, seed belt, actuators, air pressure) for obtaining a proper seed orientation and/or positioning of seed during planting in a trench or furrow in an agricultural field. Each row unit may include a respective seed disk 240-247 for receiving the seed from an auxiliary hopper, orienting the seed in a desired orientation, and then positioning the seed within the trench at a certain depth. In another example, a seed belt receives the seed from the seed disk and provides the seed to the soil. Each seed disk can include at least one seed vision system (e.g., machine vision, lidar (light detection and ranging)) to determine orientation data of the seed or a capacitive sensor to refine an orienting mechanism based on detecting a seed size at the seed disk or at the seed belt. The row units can include any of the embodiments described herein in conjunction with FIGS. 2, 3, and 4A-4C.

Figure 3:
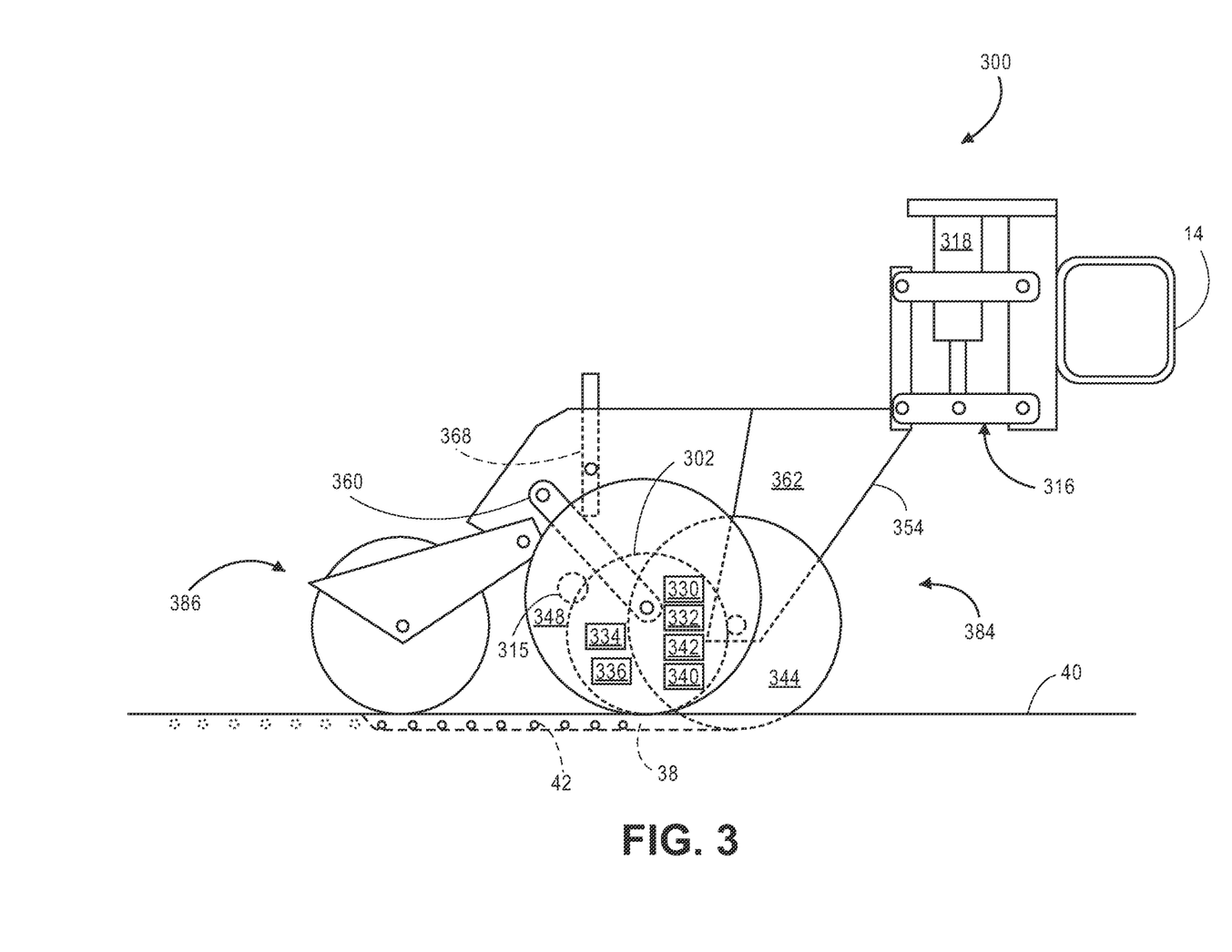
FIG. 3 illustrates an embodiment in which the row unit 300 is a planter row unit having seed orientation functionality during planting in accordance with one embodiment.

FIG. 3 illustrates an embodiment in which the row unit 300 is a planter row unit having seed orientation functionality during planting in accordance with one embodiment. The row unit 300 is preferably pivotally connected to the toolbar 14 (e.g., bar 10 of FIG. 2) by a parallel linkage 316. An actuator 318 is preferably disposed to apply lift and/or down force on the row unit 300. An opening system 384 preferably includes two opening discs 344 rollingly mounted to a downwardly-extending shank 354 and disposed to open a v-shaped trench 38 or furrow in the soil 40. A pair of gauge wheels 348 is pivotally supported by a pair of corresponding gauge wheel arms 360. The height of the gauge wheels 348 relative to the opener discs 344 sets the depth of the trench 38. A depth adjustment rocker 368 limits the upward travel of the gauge wheel arms 360 and thus the upward travel of the gauge wheels 348. A down force sensor (not shown) is preferably configured to generate a signal related to the amount of force imposed by the gauge wheels 348 on the soil 40; in some embodiments the down force sensor comprises an instrumented pin about which the rocker 368 is pivotally coupled to the row unit 300.

Continuing to refer to FIG. 3, a seed meter 302, is preferably mounted to the row unit 300 and disposed to deposit seeds 42 into the trench 38, e.g., through an actuator, hammer, or accelerator of the seed meter. An optional additional seed meter (not shown) may also be included on the row unit. The seed meter 302 preferably includes a seed side housing 330 having an auxiliary hopper 332 for storing seeds 42 to be deposited by the meter. The seed meter 302 preferably includes a vacuum side housing 340 including a vacuum port 342 pulling a vacuum within the vacuum side housing. The seed meter 302 preferably includes a vision system 334 (e.g., machine vision, lidar (light detection and ranging)) for determining orientation data of seed while on a seed disc 336 that includes seed apertures (not shown) or a capacitive sensor to refine an orienting mechanism based on detecting a seed size. The seed disc preferably separates interior volumes of the vacuum side housing and the seed side housing. In operation, seeds 42 communicated from the auxiliary hopper 332 into the seed side housing 330 are captured on the seed apertures due to the vacuum in the vacuum side housing and then provided into the trench 38. The meter is preferably powered by an individual electric drive 315. The drive is preferably configured to drive a seed disc within the associated seed meter. In other embodiments, the drive 315 may comprise a hydraulic drive or other motor configured to drive the seed disc. A closing system 386 including one or more closing wheels is pivotally coupled to the row unit 300 and configured to close the trench 38.

The seed disk is preferably designed to position seed with a desired orientation into the bottom of the trench 38 before the trench is closed. The seed disk includes a seed orientation functionality (e.g., adjustable singulators, orienters) to change an orientation of the seed. The seed disk may include an actuator to press seed into the trench 38 while preserving the desired orientation of the seed. The actuator may include at least one of an airstream and one or more mechanical actuators for pressing the seed in the trench.

Figure 4A:
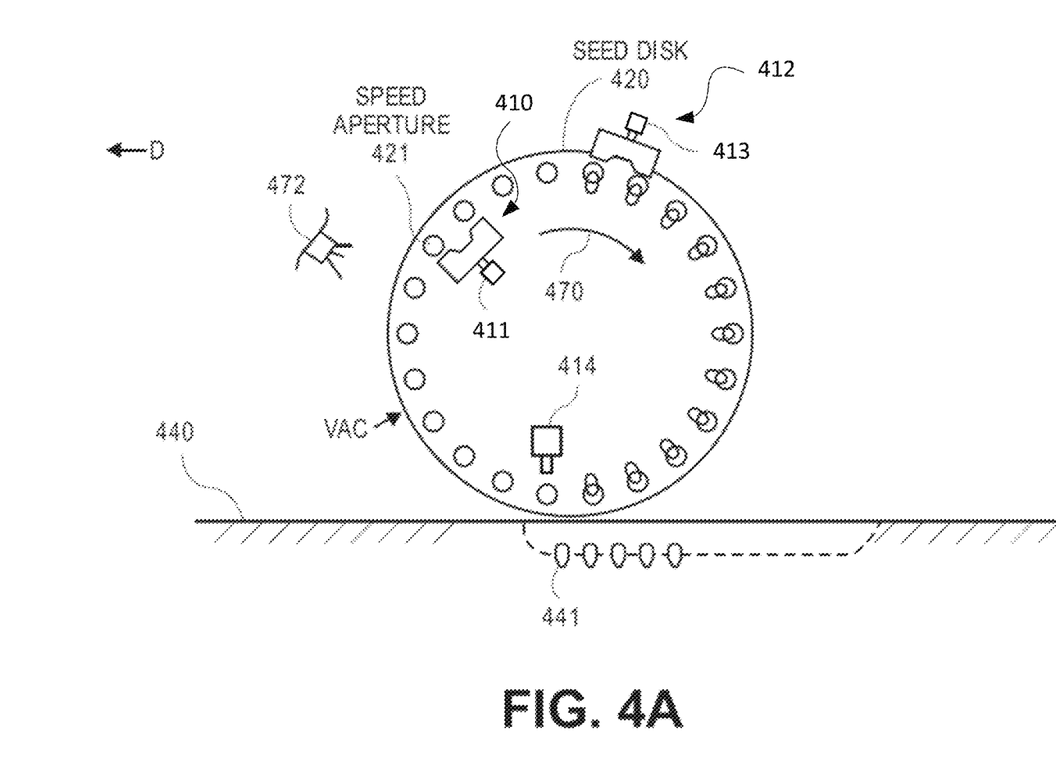
FIG. 4A illustrates a side view of a system 400 for precise seed orientation within a trench during planting of agricultural plants (e.g., corn plants, soy bean plants, etc.) in accordance with one embodiment.

FIG. 4A illustrates a side view of a system 400 for precise seed orientation within a trench during planting of agricultural plants (e.g., corn plants, soy bean plants, etc.) in accordance with one embodiment. In one example, the system 400 is included with a row unit (e.g., row units 210-217, row unit 300) having a direction of travel D. The system 400 includes a seed disk 420 for providing seed (e.g., seed 441) with a desired orientation to a trench or furrow within a ground surface 440.

A seed meter preferably includes a vision system 472 (e.g., machine vision, lidar (light detection and ranging)) for determining orientation data of seed while on a seed disc 420 that includes seed apertures 421. In operation, seeds communicated from an auxiliary hopper into the seed side housing are captured on the seed apertures due to the vacuum in the vacuum side housing. The seeds preferably have a uniform seed orientation (e.g., a longitudinal axis of the seed being aligned in a particular orientation with respect to the seed disk 420) based on adjustment with at least one of singulators 410 and 412. The seed may be randomly placed on the seed apertures and then an orientation adjustment with the singulators or orienters occurs by orienting mechanisms 411, 413 based on pre-orientation data that is obtained with the vision system 472. The seed disk rotates (e.g., clockwise rotation 470, counterclockwise rotation) and then provides the seed into a trench of the ground 440 with actuator 414 which preserves an orientation of the seed. The actuator may include at least one of an airstream and one or more mechanical actuators for pressing the seed in the trench.

In another example, the vision system 472 or a capacitive sensor determines whether the randomly placed seed on the seed apertures can be characterized as a large seed type or a small seed type. Based on this determination, at least one singulator adjusts an orientation of the seed. Lobes of a singulator may move inwards towards the seed disk or outwards away from the seed disk for this adjustment.

Figure 5:
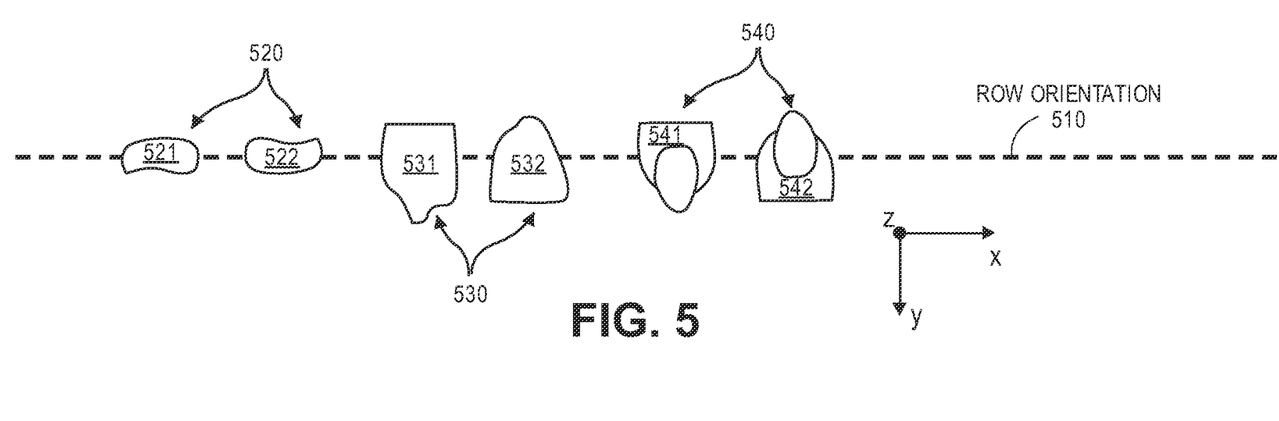
FIG. 5 illustrates a top view 500 of preferred orientations of seeds during planting in a trench or furrow.

In one embodiment, the orientation is changed with at least one of the singulators to one of the preferred orientations 520, 530, or 540 as illustrated in FIG. 5 to improve growth and orientation of leaves of the agricultural plant that has been planted.

In an alternative embodiment, active orientation using the singulators 410 and 412 of FIG. 4A can be replaced with passive orientation. Examples of passive orientation for seed on a seed disk are described and illustrated in International Publication No. WO 2016/077651, the entirety of which is incorporated by reference herein.

Figure 4B:
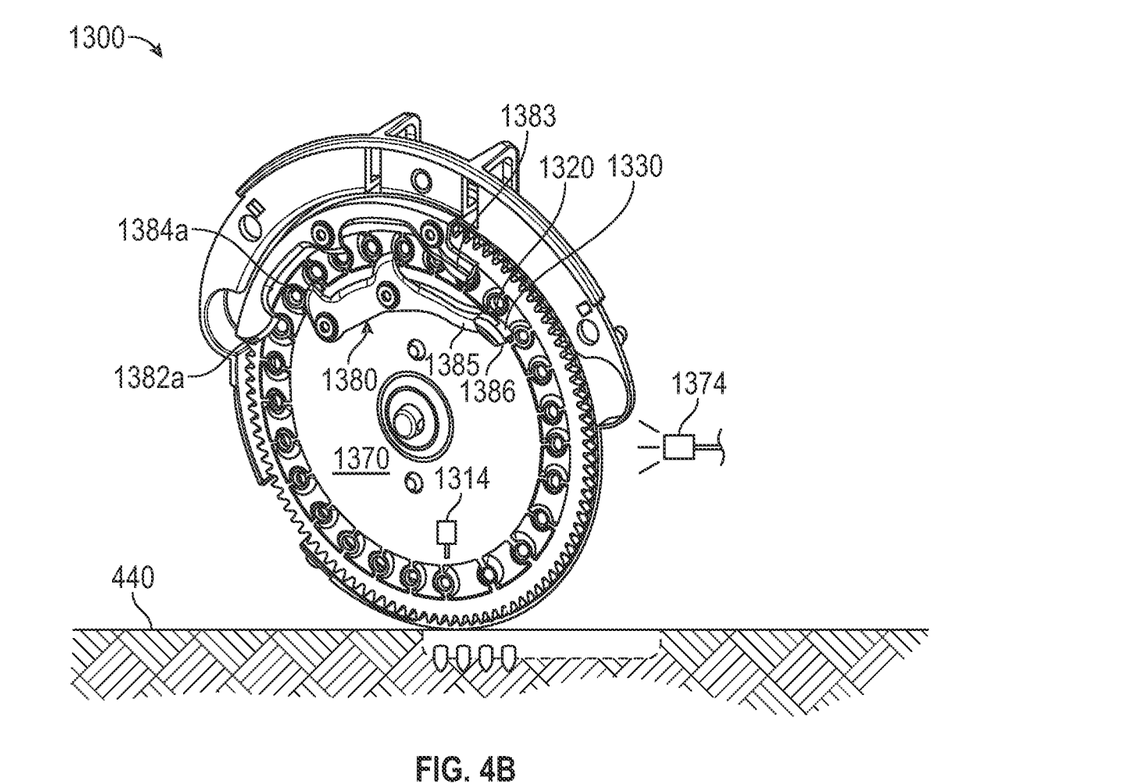
FIG. 4B is a downward perspective view of a singulator and seed disc for passive seed orientation in accordance with one embodiment.
Figure 4C:
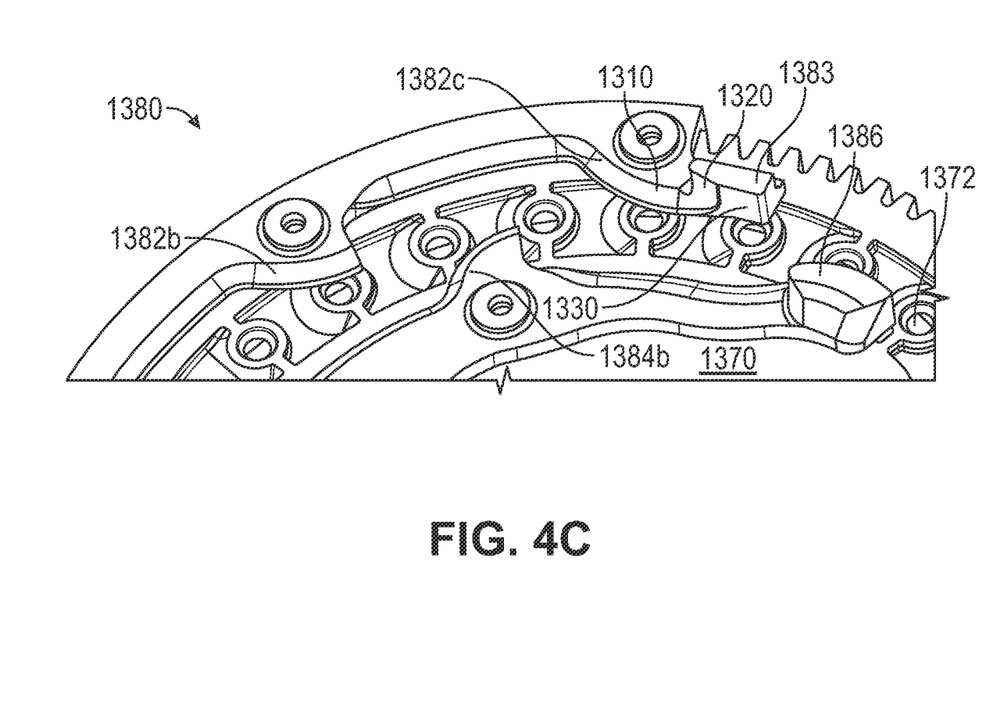
FIG. 4C illustrates an upward perspective view of a singulator and a seed disk for passive seed orientation within a trench during planting of agricultural plants (e.g., corn plants, soy bean plants, etc.) in accordance with one embodiment.

FIG. 4B illustrates a downward perspective and FIG. 4C illustrates an upward perspective view of a singulator and a seed disk for passive seed orientation during planting of agricultural plants (e.g., corn plants, soy bean plants, etc.) in accordance with one embodiment. A seed meter 1300 includes a singulator 1380 that replaces the singulators 410 and 412 in accordance with one example. A singulator 1380 is preferably disposed to remove all but one seed from each seed aperture 1372. The singulator 1380 is preferably supported by an axial spring permitting the singulator to float axially with axial movement of the seed disc 1370 as disclosed in U.S. Pat. No. 7,699,009 ("the '009 patent"), the entirety of which is hereby incorporated herein by reference. The singulator 1380 is preferably supported by a radial spring permitting the singulator to float radially with radial movement of the seed disc 1370 as disclosed in the '009 patent. The singulator 1380 is preferably disposed axially flush with the face of the seed disc 370. The singulator 1380 preferably includes a plurality of outer lobes 1382a, 1382b, 1382c disposed to partially pass over the seed apertures such that one or more seeds on a seed aperture 1372 are contacted and moved radially inwardly as the seed aperture passes each lobe.

The singulator 1380 preferably includes a plurality of inner lobes 1384a, 1384b, 1386 disposed to partially pass over the seed apertures such that one or more seeds on a seed aperture 1372 are contacted and moved radially outwardly as the seed aperture passes each lobe. In one example, each lobe preferably has an arcuate beveled surface adjacent to the seed apertures 1372 such that seeds passing the lobe are gradually moved from a first radial position to a second radial position. The arcuate beveled surface of the lobes 1382, 1384 preferably lifts seeds slightly from the surface of the disc 1370. Actual geometries of the orienting lobes and guides of the singulator are based on a targeted orientation (e.g., first seed axis) in this stage of seed orientation.

In operation, an outer seed orienting guide 1383 and an inner seed orienting guide 1386 (inner lobe) preferably change the orientation of a seed about an axis tangential to the circular path of the seed on the seed disc (a "tangential axis"). The seed orienting guides 1383, 1386 are preferably configured to reorient the seed about a tangential axis without lifting the seed from the surface of the seed disc 1370. In a preferred embodiment, the guides 1383, 1386 do not overlap the seed apertures 1372; in other embodiments, the guide 1383 slightly overlaps the seed apertures 1372. In a preferred embodiment, the seed orienting guide 1383 rotates the seed about a tangential axis in a first direction (e.g., counterclockwise along a view opposite the tangential velocity vector of the seed) and the seed orienting guide 1386 rotates the seed about a tangential axis in a second direction (e.g., clockwise along a view opposite the tangential velocity vector of the seed).

In the illustrated embodiment, the guides 1383, 1386 are mounted to the singulator 1380. The outer guide 383 is fixed to (e.g., formed as a part with) the outer lobe 382*c*. The inner guide 386 is fixed to the inner lobe 384*b* by an arm 1385; the inner guide 386 is preferably angularly spaced clockwise from the outer guide 1383 by an angular offset approximately the same as an angular offset between the inner lobe 1384*b* and the outer lobe 1382*c*. It should be appreciated that because the guides 1383, 1386 are fixed to the singulator 1380, the guides are enabled to float with the singulator to retain a consistent radial and axial position relative to the seed path of the seed disc 1370. In other embodiments, the guides 1383, 1386 may be mounted separately from the singulator 1380.

Turning to FIG. 4C, the guide 1383 preferably includes a beveled surface 1320 having a seed disk angle relative to the surface of the seed disk 1370. The seed disk angle preferably increases continuously in a clockwise direction such that seeds are reoriented by contact with the beveled surface 1320 as the seeds pass the guide 1383 in the clockwise direction. A beveled surfaced 1310 is preferably disposed between the lobe 1382*c* and the beveled surface 1320. The beveled surface 1310 preferably continuously guides the seed from contact with the lobe 1382*c* to contact with the beveled surface 1320. The guide 1383 preferably further includes an axial surface 1330 preferably disposed clockwise of the beveled surface 1320. The axial surface 1330 preferably extends clockwise along the seed path such that seeds passing the axial surface 1330 in a clockwise direction contact the axial surface 1330 and remain radially inward of the axial surface 1330. In some embodiments the axial surface 1330 is disposed at or radially outward from a radially outer end of the seed apertures; in other embodiments, the axial surface 1330 is disposed radially inward of the radially outer end of the seed apertures and radially outward of the center of the seed apertures. An optional vision system 1374 is located in proximity to the seed disk to provide feedback for a correct orientation of the seeds. Also optionally, the aggressiveness of the orienter features (e.g., 1383, 1386) in terms of an extent of adjustment of orientation can be automatically adjusted based on feedback from at least one vision system (e.g., 1374).

The seed disk rotates and then provides the seed into a trench of the ground 440 with actuator 4134 which preserves an orientation of the seed. The actuator may include at least one of an airstream and one or more mechanical actuators for pressing the seed in the trench of the ground surface 440.

In one embodiment, the orientation is changed with the singulator 1380 to one of the preferred orientations 520, 530, or 540 as illustrated in FIG. 5 to have a uniform seed orientation for seed in a furrow or trench. This causes faster uniform emergence from the soil, approximately uniform growth and height of the plants, approximately uniform consumption of water and nutrients for the plants, uniform collection of sunlight for each plant, and improves growth and orientation of leaves of the agricultural plants that have been planted.

FIG. 5 illustrates a top view 500 of desired or preferred orientations of seeds during planting in a trench or furrow. Rows of corn plants have a row orientation 510 in a field. Seed 521 and 522 have a first orientation 520 in which tips of the seed are positioned in a downward direction (z-axis) into the ground and embryos are positioned in a direction (y-axis) that is transverse with respect to a direction (x-axis) of the row orientation 510. Seed 531 and 532 have a second orientation 530 in which tips of the seed are positioned in a direction (y-axis) that is transverse with respect to a direction (x-axis) of the row orientation 510 and embryos face downwards into the ground. Seed 541 and 542 have a third orientation 540 in which tips of the seed are positioned in a direction (y-axis) that is transverse with respect to a direction (x-axis) of the row orientation 510 and embryos face upwards away from the ground. These seed orientations 520, 530, and 540 are designed to produce leaves of the corn plants having a longitudinal axis in a direction (y-axis) that is substantially transverse with respect to a direction (x-axis) of row orientation 510 or at least having a longitudinal axis of leaf orientations that are not parallel with respect to a direction of the row orientation 510. In this manner, leaves will have more sun exposure and less shading from other leaves or adjacent plants in a row. In one example, a desired leaf orientation or range of leaf orientations is any orientation that is not parallel or substantially parallel with a direction (x-axis) of row orientation 510. In another example, a desired leaf orientation or range of leaf orientations is any orientation that is substantially perpendicular with a direction (x-axis) of row orientation 510 within a certain angular rotation (e.g., +/−45 degrees from being perpendicular to the x-axis).

Figure 6:
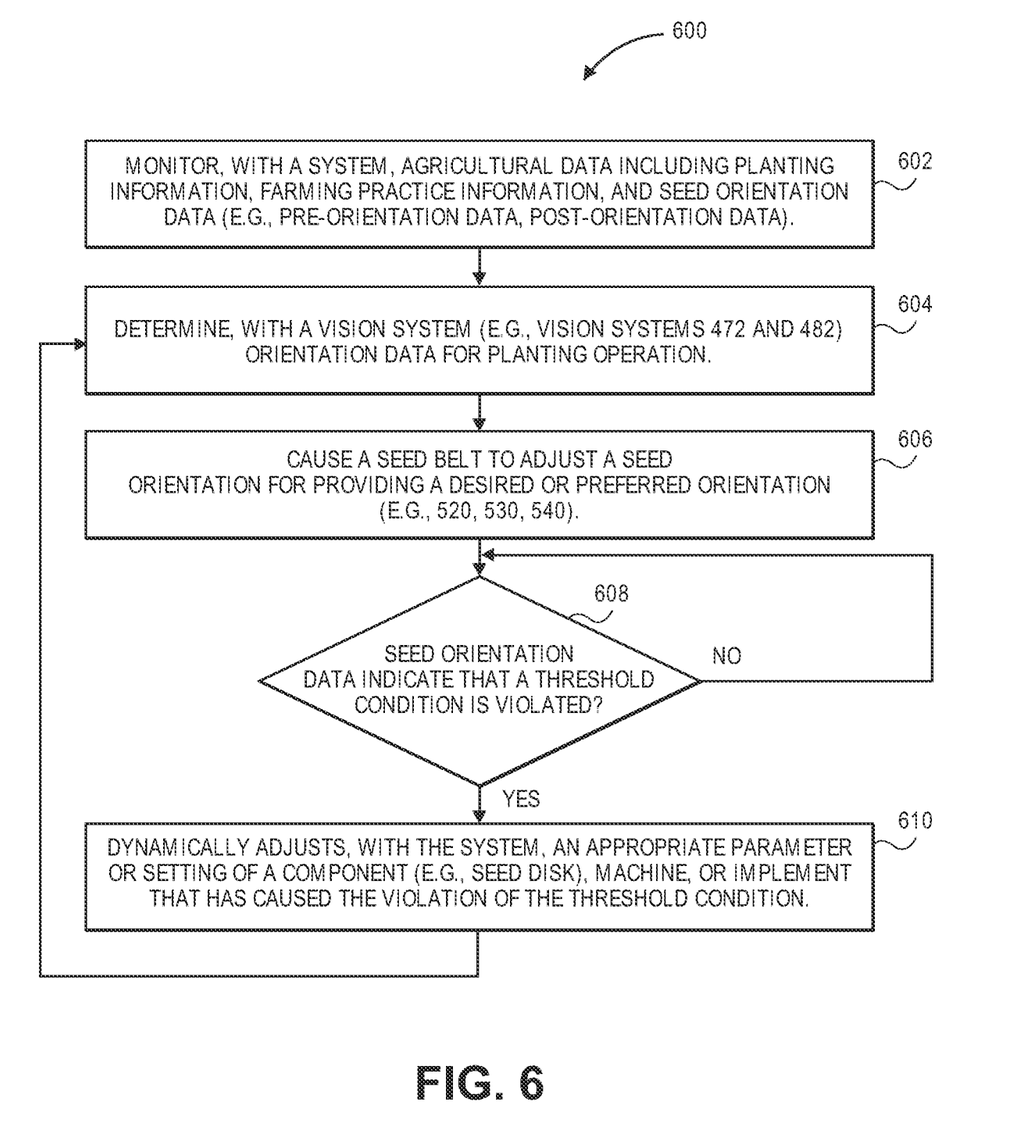
FIG. 6 illustrates a flow diagram of one embodiment for a method 600 of providing a preferred seed orientation during planting for field operations.

FIG. 6 illustrates a flow diagram of one embodiment for a method 600 of providing a preferred seed orientation during planting for field operations. The method 600 is performed by processing logic that may comprise hardware (circuitry, dedicated logic, etc.), software (such as is run on a general purpose computer system or a dedicated machine or a device), or a combination of both. In one embodiment, the method 600 is performed by processing logic of at least one data processing system (e.g., system 102, machine, implement, row unit, user device, etc.). The system or device executes instructions of a software application or program with processing logic. The software application or program can be initiated by a system or may notify an operator or user of a machine (e.g., tractor, planter, combine) depending on whether seed orientation needs to be changed.

At block 602, a system monitors agricultural data including planting information, farming practice information, and seed orientation data (e.g., pre-orientation data, post-orientation data). A vision system (e.g., vision system 472, vision system 482, vision system 1374) determines orientation data for orientation of seed on a seed disk for a planting operation at block 604. At block 606, the system (or device) causes the seed disk to adjust a seed orientation with at least one singulator or orienter for providing a desired or preferred orientation (e.g., 520, 530, 540). This adjustment may be based at least partially on the orientation data for the seed on the seed disk. At block 608, the system dynamically determines whether the seed orientation data indicates that a threshold condition (e.g., threshold condition for range of orientations at seed disk) has been violated. If so, then the system dynamically adjusts an appropriate parameter or setting of a component (e.g., orientation of seed at seed disc), machine, or implement that has caused the violation of the threshold condition at block 610. The method 600 can then return to block 604 to continue collecting orientation data for a planting operation. If no violation occurs at block 608, the method continues to monitor seed orientation data to determine if the threshold condition has been violated at block 608.

Figure 7:
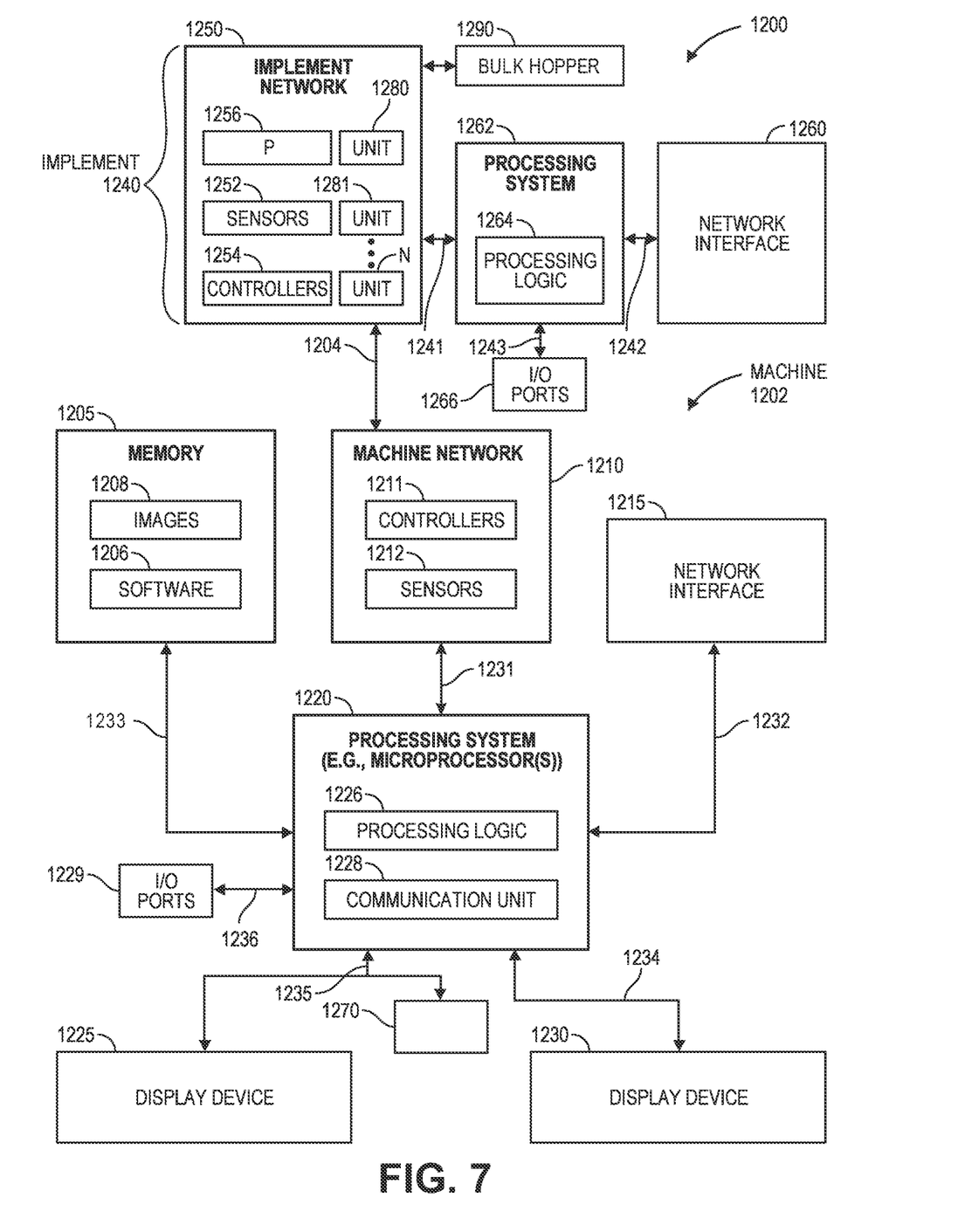
FIG. 7 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment.

FIG. 7 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for planting operations of a field. The seed orientation data for each row unit of the implement can be associated with locational data at time of planting to have a better understanding of the seed orientation for each row and region of a field. Data associated with the planting can be displayed on at least one of the display devices 1225 and 1230.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, planting data, seed orientation data, etc.). The system 1200 includes memory 1205 for storing data and programs for execution (software 1206) by the processing system. The memory 1205 can store, for example, software components such as planting software for analysis of planting and seed orientation for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, cab control module 1270, display device 1230, display device 1225, and I/O ports 1229 via communication links 1231-1236, respectively.

Display devices 1225 and 1230 can provide visual user interfaces for a user or operator. The display devices may include display controllers. In one embodiment, the display device 1225 is a portable tablet device or computing device with a touchscreen that displays data (e.g., planting data, seed orientation data, captured images, localized view map layer, high definition field maps of as-applied seed orientation data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied planting data including seed orientation data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) is coupled to at least one bulk hopper 1290 with each bulk hopper containing a seed variety (e.g., a seed variety or a soybean variety). Each bulk hopper is preferably in fluid communication with an individual seed entrainer (not shown). Each seed entrainer is preferably mounted to a lower outlet of the associated bulk hopper. Each seed entrainer is preferably in fluid communication with a pneumatic pressure source P 1256 and configured to convey air-entrained seeds through a plurality of seed lines to the row units 1280, 1281, . . . N. The implement includes sensors 1252 (e.g., speed sensors, seed sensors for detecting passage of seed, sensors for determining seed orientation data, downforce sensors, actuator valves, moisture sensors or flow sensors for a combine, speed sensors for the machine, seed force sensors for a planter, liquid application sensors for a sprayer, or vacuum, lift, lower sensors for an implement, flow sensors, etc.), controllers 1254 (e.g., GPS receiver, drive controller), and the processing system 1262 for controlling and monitoring operations of the implement. For example, the controllers may include processors in communication with a plurality of seed sensors. The processors are configured to process data (e.g., seed orientation data, seed sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed disk and a seed belt for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A row unit for seed orientation comprising:
   a seed disk capable of rotation and having at least one singulator to adjust an orientation of seed to a desired seed orientation for placement within a furrow during planting; and
   a capacitive sensor in proximity to the seed disk, wherein the capacitive sensor is configured to refine an orienting mechanism of the at least one singulator based on detecting seed orientation data including a seed size.

2. The row unit of claim 1, further comprising:
   an actuator coupled to the seed disk, the actuator configured to individually position each seed into the furrow during planting.

3. The row unit of claim 2, wherein the actuator is configured to preserve the desired seed orientation of the seed.

4. The row unit of claim 1, wherein the at least one singulator comprises a body defining a plurality of lobes, the lobes comprising the orienting mechanism, for passively orienting the seed with the desired seed orientation.

5. The row unit of claim 1, wherein the at least one singulator is configured to adjust an orientation of seed to a desired seed orientation based on the seed orientation data including seed geometry and size.

6. The row unit of claim 1, wherein the at least one singulator is configured to adjust an orientation of the seed to have a longitudinal axis of the seed aligned in a particular orientation with respect to the seed disk.

7. The row unit of claim 1, further comprising:
   a vision system in proximity to the seed disk, the vision system configured to determine seed orientation data for seed on the seed disk.

8. An implement comprising:
   a frame; and
   a plurality of row units coupled to the frame, each row unit comprising:
      a seed disk capable of rotation and having at least one singulator to adjust an orientation of seed to a desired seed orientation for placement within a furrow during planting; and
      a capacitive sensor in proximity to the seed disk, wherein the capacitive sensor is configured to refine an orienting mechanism of the at least one singulator based on detecting seed orientation data including a seed size.

9. The implement of claim 8, further comprising:
an actuator coupled to the seed disk, wherein the actuator is configured to individually position each seed into the furrow during planting.

10. The implement of claim 9, wherein the actuator is configured to preserve the desired seed orientation of the seed.

11. The implement of claim 8, wherein the at least one singulator comprises a body defining a plurality of lobes, the lobes comprising the orienting mechanism, for passively orienting the seed with the desired seed orientation.

12. The implement of claim 8, wherein the at least one singulator is configured to adjust an orientation of seed to a desired seed orientation based on seed orientation data including seed geometry and size.

13. The implement of claim 8, wherein the at least one singulator is configured to adjust an orientation of the seed to have a longitudinal axis of the seed aligned in a particular orientation with respect to the seed disk.

\* \* \* \* \*